(No Model.) 2 Sheets—Sheet 1.
A. SCHMALZ.
HOT AIR OR STEAM MOTOR.
No. 340,824. Patented Apr. 27, 1886.
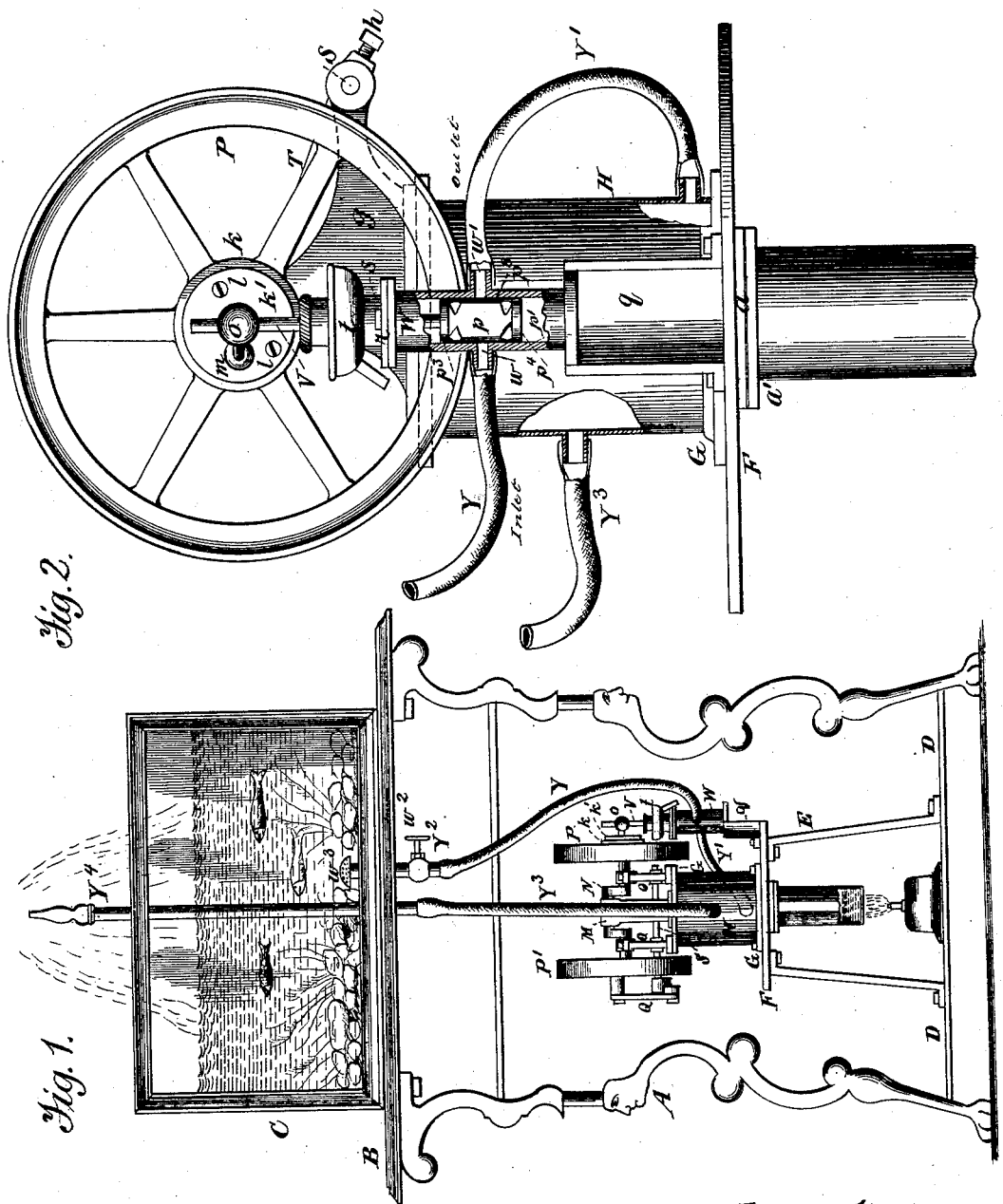

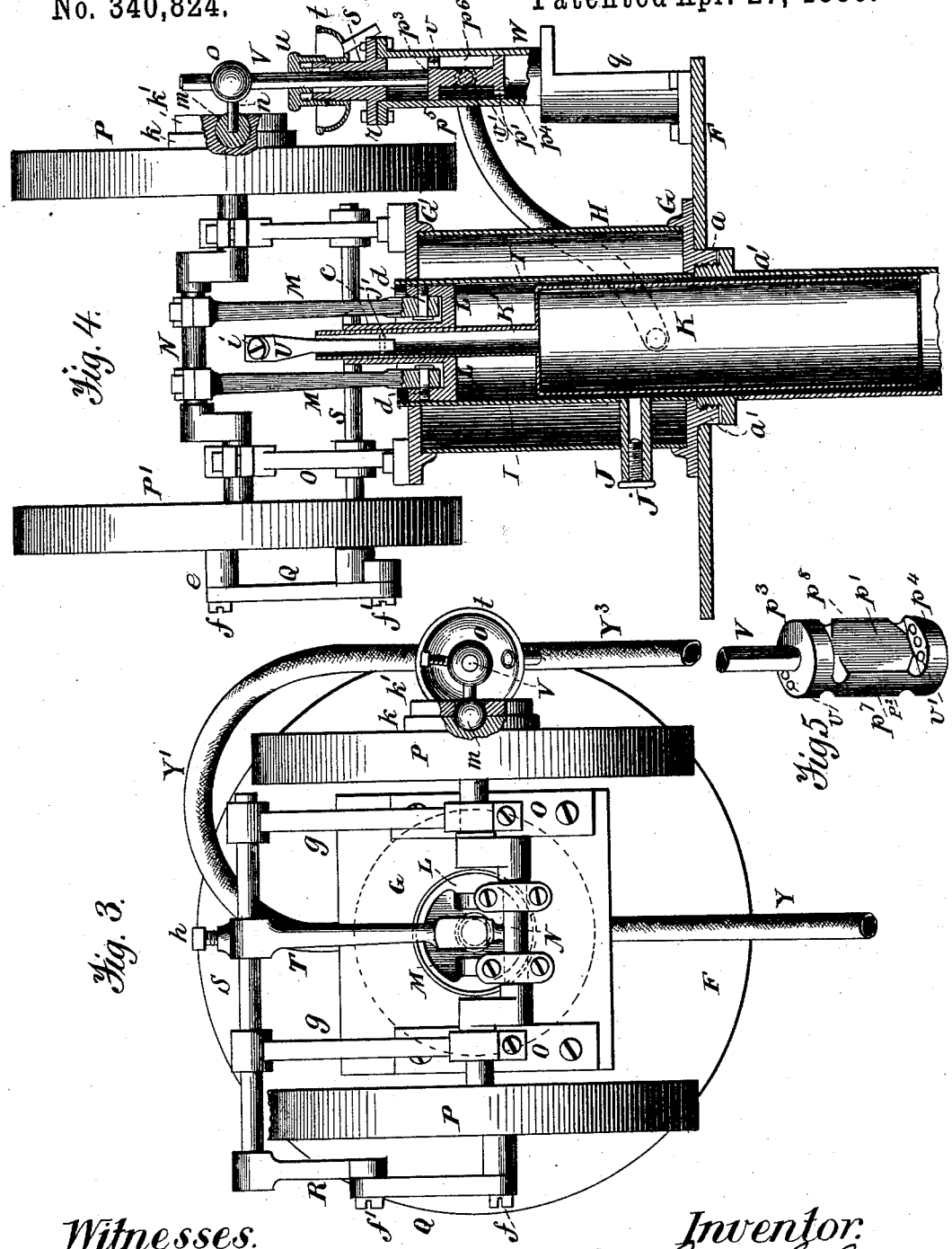

UNITED STATES PATENT OFFICE.

ARTHUR SCHMALZ, OF DUNDEE, ILLINOIS, ASSIGNOR OF TWO-THIRDS TO AUGUST NOLTE AND WILHELM LORENZ, BOTH OF SAME PLACE.

HOT-AIR OR STEAM MOTOR.

SPECIFICATION forming part of Letters Patent No. 340,824, dated April 27, 1886.

Application filed October 21, 1885. Serial No. 180,552. (No model.)

*To all whom it may concern:*

Be it known that I, ARTHUR SCHMALZ, a citizen of the United States, residing at Dundee, in the county of Kane and State of Illinois, have invented certain new and useful Improvements in Hot-Air and Steam Motors; and I do hereby declare the following to be a full, clear, and exact description of the invention, such as will enable others skilled in the art to which it appertains to make and use the same.

My invention relates to a hot-air or steam motor, and has for its object to so construct the parts that a continuous flow of water will be injected into the air, so that the water will be constantly charged with air, in order to better and longer sustain animal and vegetable life, where the fountain is used either as an aquarium or for the growth of plants.

To the accomplishment of the above and such other objects as the several parts may be adapted to, the invention consists in the construction and the combination of the several parts hereinafter particularly described, and then specified by the claims.

Figure 1 of the drawings is an elevation of the aquarium and motor; Fig. 2, a side view, on an enlarged scale, of the motor, looking at the pump side thereof, with the pump-cylinder in section and certain parts broken away. Fig. 3 is a plan view of the motor with parts broken away and others in section. Fig. 4 is a front elevation of the motor with the several cylinders in section. Fig. 5 is a perspective of the pump-piston.

In the drawings, the letter A designates a stand of any approved design, on the top B of which is supported a glass or other transparent aquarium or water-vessel, C. Beneath this vessel, on a cross plate or bar, D, secured to the legs of the table, there is supported a table or standard, E, at the upper end of which is a bed-plate, F. This bed-plate supports the lower head, G, of a liquid-reservoir, H, the head preferably being formed with a flange, a, interiorly screw-threaded and extending, as shown, through an opening in the bed-plate. The head may be secured to the bed-plate by means of bolts b, and both the lower head and the upper head, G', may be secured in any well-known way to the reservoir-cylinder H. Within the reservoir-cylinder H there is a piston-cylinder, I, the lower part of which is made separate from the upper part, and is held in place by a screw-flange, a', engaging with the screw-flange a. The object of making the piston-cylinder sectional is to permit access to the interior for any necessary purpose, especially for the purpose of introducing water into the lower part. The upper portion of the cylinder is secured rigidly within the reservoir in any suitable manner. A vent pipe or tube, J, leads from the cylinder to the outside of the reservoir for the escape of air and vapor when heat is first applied to the cylinder, and it is controlled by a screw-plug, J'.

A hollow displacer, K, fits within the piston-cylinder, and it is formed with a prolonged hollow neck or shank, K', preferably open at its upper end and extending up through the piston L, which has a tubular collar, c, fitting around the neck of the displacer. This piston works within its cylinder I, and has the lower ends of the two connecting-rods M pivoted to it by bolts d or other suitable means. The upper ends of these rods are connected in any suitable way to the crank-shaft N, which is supported by brackets O, resting upon the top head, G', of the reservoir H. The crank-shaft carries at opposite ends the fly-wheels P and P'. A pin, e, projects from the wheel P', near the crank-shaft, and to its end there is pivoted, by means of a screw, f, a link, Q, the other end of which is pivoted by a screw, f', to the end of the crank-arm R, which is secured at its other end to the shaft S, journaled in the two arms g, which extend back from the brackets O. A pitman, T, connected at one end to the shaft S by a set-screw, h, is connected at the other end to the shank of the displacer K by means of an elastic strap, U, secured to the end of the pitman by means of a screw, i, and to the shank or neck K' by means of a pin, j, the end of the strap preferably extending down into the hollow shank. This elastic strap permits the pitman to move in the arc of a circle without moving the displacer out of a vertical line.

The wheel P has on its outside face a plate or disk, $k$, to which is secured a cap, $k'$, by means of screws $l$. The meeting faces of the disk and cap are recessed so as to form a seat or socket for the ball $m$, which is connected by a rod, $n$, to the ball $o$, secured to the rod V of the pump-piston $p$. A ball-and-socket joint connection or coupling is thus formed between the fly-wheel and pump-piston.

The pump-cylinder W is supported by a bracket, $q$, resting upon the bed-plate F, and its head $r$ has the stuffing-box $s$ formed with it. Around the upper portion of this box there is secured a cup, $t$, for what little water may waste into it, and a cap, $u$, screws onto the end of the stuffing-box.

The pump-piston $p$ is flattened on opposite sides, $p'$ $p^2$, between its faces or heads $p^3$ $p^4$, to form chambers $p^5$ $p^6$ between its sides and the sides of the pump-cylinder, while the full sides $p^7$ $p^8$ constitute a cut-off valve for controlling the flow of water into and out of the two chambers alternately. The upper face of the piston is provided with apertures $v$ on one side of the piston, and the lower face with apertures $v'$ on the opposite side, for the passage of water into the cylinder between the heads of the latter and the heads of the piston, so that a larger volume of water can be contained than in the chambers $p^5$ and $p^6$ alone.

The pump-cylinder has an inlet, $w$, on one side, which connects with the source of supply through a pipe, Y, and an exit, $w'$, on the opposite, which connects with the receiving-vessel—in this case with the reservoir H—through a pipe, Y'. These inlet and exit passages are controlled by the full sides $p^7$ and $p^8$ of the valve-piston, so that when the piston is turned and at the same time moved in one direction by the ball-and-socket coupling to the fly-wheel, the water is drawn into one chamber—say $p^5$—while it is forced out of chamber $p^6$, and then when the piston has completed its stroke in that direction and been turned by the ball-and-socket coupling so as to bring the full sides of the piston on the opposite sides of the inlet and exit openings, and the piston then reciprocated in the opposite direction, the water will be drawn into chamber $p^6$, and forced out of chamber $p^5$, and thus the water is alternately drawn into and forced out of the two chambers, and a continuous flow maintained.

In the drawings the pipe Y is shown as connected with the aquarium through a tube, $Y^2$, provided with a valve, $w^2$, and having a screen, $w^3$, to exclude rubbish and other foreign matter, and the pipe $Y^3$, which leads from the reservoir, connects with the rigid pipe $y^4$, passing up above the aquarium. The water drawn from the aquarium through pipe Y is forced by the pump into reservoir H, and out thereof through pipes $Y^3$ and $Y^4$ into the air above the aquarium, and after thus becoming charged with air falls into the aquarium or vessel C, and furnishes pure or purified water for the fishes or plants or other objects in the vessel.

To operate the motor a very small quantity of water is placed in the lower section of cylinder I. A lamp or other heating medium is then placed under the cylinder I, and the vent-tube J opened until the motor is fairly started, when it is closed. The heat from the lamp converts the water into steam, which drives the piston L upward. This forces the displacer K downward, which forces the steam up into contact with the water-cooled sides of the reservoir H, whereby the steam is reconverted into water, which falls to the bottom of the cylinder I, and there is again converted into steam, when the action is repeated as at first. If the water be not used, the parts will act as a hot-air motor, the expansion of the air by the heat and its displacement by the displacer, as in hot-air motors, operating to actuate the pump and effect a continuous flow of water.

This motor is very simple in the construction of all its parts, and can be made and run at the minimum of expense; and obvious changes in the details of construction of the several parts can be made without departing from the spirit of the invention.

I am aware of German Patent No. 13,830, and of United States Patent to R. Eickmeyer, May 6, 1873, No. 138,622, and lay no claim to anything therein shown.

Having described my invention and set forth its merits, what I claim is—

1. The combination of the motor-piston cylinder, the vent-tube J, connected therewith, the displacer, and the piston in said cylinder, the crank-shaft, the rods connecting the shaft and piston, the pitman connected to the displacer, the shaft to which the pitman is connected, and connections between the two shafts to operate the piston and displacer conjunctively, substantially as described.

2. The combination of the pump-cylinder having inlet and exit openings, the piston formed with flattened sides and perforated heads, the piston-rod, a motor embodying a piston and a displacer, and a jointed coupling eccentrically connecting the rod and motor, substantially as described.

3. The combination, with a motor having a cylinder, I, a piston and displacer reciprocating therein, and a fly-wheel, P, moved from said piston and displacer, of a reservoir, H, a pump-cylinder, W, connected with said reservoir, a piston reciprocating and rotating within the pump-cylinder, a piston-rod, and a jointed coupling eccentrically connecting the piston-rod and fly-wheel of the motor to reciprocate and rotate said pump-piston, substantially as described.

4. The combination, with vessels C and H and a pipe leading from one to the other, of a pump-cylinder, W, connected with vessels C and H by separate pipes, a piston-rod and a reciprocating and rotating piston in the pump-cylinder for withdrawing water from vessel C and forcing it into vessel H, and from thence into vessel C, a motor embracing a cylinder, I, piston L and displacer K, reciprocating therein, and a fly-wheel, P, revolved from said piston and displacer, and a jointed coupling eccentrically connecting the piston-rod and fly-wheel for reciprocating and rotating the piston, substantially as described.

5. The combination of the cylinder I, the displacer K and piston L, reciprocating therein, the crank-shaft N, carrying fly-wheels P and P', the rods M, connecting said shaft and piston, shaft S, pitman T, connected by elastic straps U with displacer K and arm R, and link Q, connecting fly-wheel P' and shaft S, substantially as described.

In testimony whereof I affix my signature in presence of two witnesses.

ARTHUR SCHMALZ.

Witnesses:
VINCENT S. LOVELL,
WILHELM GRUEL.